US012776996B2

(12) United States Patent
Rao

(10) Patent No.: US 12,776,996 B2

(45) Date of Patent: Oct. 27, 2026

(54) PACKET SIZE PARAMETER REWRITE BASED ON NETWORK DYNAMICS

(71) Applicant: Arista Networks, Inc., Santa Clara, CA (US)

(72) Inventor: Anand Narayanan Rao, Bangalore (IN)

(73) Assignee: Arista Networks, Inc., Santa Clara, CA (US)

(*) Notice: Subject to any disclaimer, the term of this patent is extended or adjusted under 35 U.S.C. 154(b) by 687 days.

(21) Appl. No.: 17/868,303

(22) Filed: Jul. 19, 2022

(65) Prior Publication Data

US 2024/0031303 A1 Jan. 25, 2024

(51) Int. Cl.

*H04L 47/36* (2022.01)

*H04L 12/46* (2006.01)

(52) U.S. Cl.

CPC ........ *H04L 47/365* (2013.01); *H04L 12/4633* (2013.01)

(58) Field of Classification Search

CPC .......................... H04L 47/365; H04L 12/4633

See application file for complete search history.

(56) References Cited

U.S. PATENT DOCUMENTS

| | | | | |
|---|---|---|---|---|
| 6,975,647 | B2 * | 12/2005 | Neale | H04L 69/165 370/401 |
| 9,497,106 | B2 * | 11/2016 | Khanal | H04L 45/021 |
| 10,498,529 | B1 * | 12/2019 | Hashmi | H04L 9/0618 |
| 12,068,886 | B2 * | 8/2024 | Shen | H04L 61/2592 |
| 2012/0281559 | A1 * | 11/2012 | Ner | H04W 28/06 370/252 |
| 2021/0281514 | A1 * | 9/2021 | Guo | H04L 41/0896 |
| 2022/0200896 | A1 * | 6/2022 | Zhou | H04L 45/02 |
| 2022/0394014 | A1 * | 12/2022 | Wang | H04L 45/123 |

OTHER PUBLICATIONS

U.S. Appl. No. 17/535,248, filed Nov. 24, 2021.

U.S. Appl. No. 17/704,426, filed Mar. 25, 2022.

* cited by examiner

*Primary Examiner* — Kevin T Bates

*Assistant Examiner* — Jaeyoung Kwak

(74) *Attorney, Agent, or Firm* — Treyz Law Group, P.C.; Tianyi He

(57) ABSTRACT

A network device may receive a packet from a virtual tunnel end point. The packet may be configured to have a transmission control protocol (TCP) maximum segment size (MSS) data field containing a value. The network device may be configured to determine a minimum Maximum Transmission Unit (MTU) value to the virtual tunnel end point. The network device may be configured to replace the value with a replacement value based on the minimum MTU value.

20 Claims, 10 Drawing Sheets

46

$$MTU_{min} = \min(MTU_{path1}, MTU_{path2}, \ldots MTU_{pathN})$$

FIG. 5A

48

$$MSS_{updated} = MTU_{min} - Header\ Length$$

FIG. 5B

50

| PATH (DIRECTIONALITY FROM SRC TO DST) | MTU (BYTES) |
|---|---|
| 12-1A | 1500 |
| 12-1B | 1450 |
| 12-1 (ACROSS 12-1A AND 12-1B) | 1450 |
| 12-2 | 1300 |
| 12-3 | 1400 |
| (ACROSS 12-1, 12-2, AND 12-3) | $MTU_{min}$ = 1300 |

FIG. 6A

52

| MSS DATA | VALUE (BYTES) |
|---|---|
| MSS2 | 1410 |
| MSS2' ($MSS_{updated}$) | 1260 |

FIG. 6B

54

| FLOW DESTINATION VTEP IP ADDRESS | $MTU_{min}$ (BYTES) |
|---|---|
| VTEP IP 1 | 1300 |
| VTEP IP 2 | 1410 |
| ⋮ | ⋮ |

FIG. 7

PACKET SIZE PARAMETER REWRITE BASED ON NETWORK DYNAMICS

BACKGROUND

Host devices may exchange messages over a network. As one example, Transmission Control Protocol (TCP) is a transport layer communications standard that can be used to exchange these messages. In particular, using TCP, two devices can open a connection to communicate with each other using an initial handshake sequence. As part of the handshake sequence, the two devices can share corresponding maximum segment size (MSS) parameters, which limit the size of data packets (more specifically, the size of the payload in the packets) that are sent between the devices during the TCP connection.

BRIEF DESCRIPTION OF THE DRAWINGS

FIGS. 5A and 5B are illustrative mathematical formulas for processing path MTU information and arriving at an updated MSS value in accordance with some embodiments.

FIGS. 6A and 6B are tables showing illustrative examples of path MTU values and MSS values in a sample configuration of a network such as the network of FIG. 4 in accordance with some embodiments.

FIG. 7 is a table showing illustrative path MTU information maintained at a network device in accordance with some embodiments.

DETAILED DESCRIPTION

Host devices may communicate with one another using the Transmission Control Protocol (TCP) standard to exchange messages over a network. To establish a TCP session between hosts (e.g., a client device and a server device), a 3-way handshake using SYN, SYN ACK, and ACK packets may be conveyed between the hosts. In particular, the SYN and SYN ACK packets may each include a maximum segment size (MSS) parameter to indicate the maximum size of the payload that can be sent between the client and server devices (e.g., the SYN packet includes the MSS value indicative of the maximum payload size of packets from the server to the client, and the SYN ACK packet includes the MSS value indicative of the maximum payload size of packets from the client to the server).

To reduce or eliminate the likelihood of packet fragmentation, the TCP MSS value can be updated with a reduced TCP MSS (clamp) value based on a fixed pre-determined end-to-end path Maximum Transmission Unit (MTU) value at an edge router connected to a sending host such that the receiving host receives the reduced TCP MSS value and only sends packets with sizes that conform to the reduced TCP MSS value. However, this approach has several limitations, especially in network environments where paths (and therefore path MTU values) change as network topology and packet routing changes dynamically during operation, where path MTU values for a same path have different values depending on the direction of packet traversal, and/or where a large number of tunnel and path groups are managed therein.

To mitigate these issues in one illustrative example, an ingress module on a router may automatically rewrite a TCP MSS value on an incoming SYN ACK (or TCP SYN) packet based on the MTU values for all of the different paths from the router to the opposite router sending the packet. This may be especially useful for dynamic path selection tunnels where different paths with varying MTU values may be used to convey packets during a TCP session.

Details for the rewriting of a packet size parameter based on network dynamics (as illustrated in the above example) are further described below.

A computer network can include network equipment forming a variety of network devices that interconnect end hosts of the network. Network devices can include switches, bridges, routers, hubs, repeaters, firewalls, wireless access points, devices serving other networking functions, devices that include the functionality of two or more of these devices, and management equipment that manage and control the operation of one or more of these devices. End hosts of the network can include computers, servers, network service devices, and any other suitable types of specialized or general-purpose host equipment, e.g., each running one or more client-side and/or server-side applications.

Figure 1:
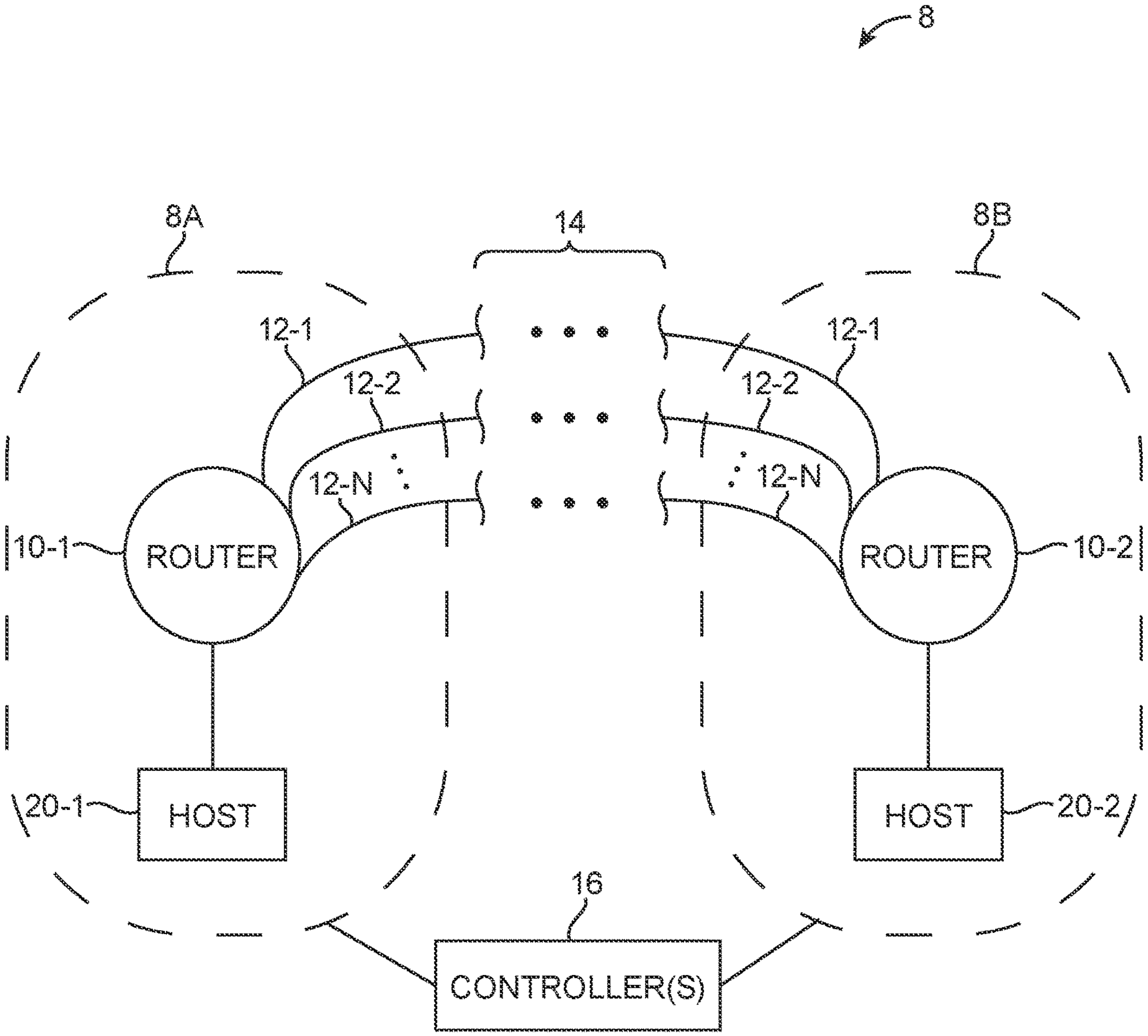
FIG. 1 is a functional block diagram of an illustrative network through which data packets are routed in accordance with some embodiments.

FIG. 1 is a diagram of an illustrative network such as network 8. A network may be implemented with any suitable scope (e.g., as a campus area network, as a local area network, as a wide area network, etc.). Configurations in which network 8 is a wide area network (WAN) are described herein as an illustrative example. In particular, a wide area network may be a communications network that extends over a large geographical area for implementing computer networking functions.

In the example of FIG. 1, network 8 includes a first network portion 8A and a second network portion 8B interconnected by other portions of network 8. In the example of a wide area network, the network may be organized based on hierarchical structures such as one or more domains, each domain containing one or more regions, each region containing one or more sites. As an illustrative example, a domain may cover a continent (e.g., North America, Europe, etc.), a region may cover some or more states, cities, and/or provinces within the domain, and a site may cover and/or represent a physical location (and or virtual instance thereof) (e.g., a building such as an office, school, hospital, etc.) within the region. In general, network 8 may include (cover) any suitable number of domains, any suitable number of regions within each domain, and any suitable number of sites within each region, or may be a network organized in other manners (e.g., using other hierarchical or non-hierarchical structures).

Network portions 8A and 8B may respectively represent two interconnected domains, two interconnected regions (within the same or different domains), and/or two interconnected sites (within the same or different regions). Configurations in which network portions 8A and 8B represent two different sites that are interconnected via network paths 12 (e.g., virtual tunnels) are described herein as an illustrative example. In this manner, network 8 may sometimes be referred to herein as an enterprise network having multiple enterprise network sites 8A and 8B.

As shown in FIG. 1, network portion 8A may include router 10-1 such as an edge router connected to one or more end hosts. In particular, end host 20-1 may be connected to edge router 10-1. If desired, network portion 8A (at a first site) may include any suitable number of other network devices and end hosts (other than router 10-1 and end host 20-1). Similarly, network 8B may include router 10-2 such as an edge router connected to one or more end hosts. In particular, end host 20-2 may be connected to edge router 10-2. If desired, network portion 8B (at a second site) may include any suitable number of other network devices and end hosts (other than router 10-2 and end host 20-2).

Network devices in network portion 8A, network devices in network portion 8B, and network devices in other network portions may communicate (e.g., transfer information in the form of network traffic such as data packets) with one another using one or more service provider networks 14. As examples, service provider networks 14 may include one or more internet service provider networks (e.g., the Internet) or other public service provider networks, may include private service provider networks (e.g., multiprotocol label switching (MPLS) networks), may include other types of service provider networks such as telecommunication service provider networks (e.g., an LTE network), etc.

In the example of FIG. 1, router 10-1 is shown to be connected directly (without another intervening router) to host 20-1. Edge router 10-2 is similarly shown to be connected directly to host 20-1. This is merely illustrative. If desired, additional network routers or other network devices may be interposed between the router and the corresponding end host.

Edge router 10-1 and edge router 10-2 may be connected to each other via a number of different network paths 12-1, 12-2, . . . , 12-N. Paths 12 (collectively referring to paths 12-1, 12-2, . . . , 12-N) may each run through any suitable number of network devices (e.g., intervening (hub) routers, no intervening network devices, etc.) in network 8 and through one or more of the same or different service provider networks 14.

The elements and their relative arrangements shown in FIG. 1 are merely illustrative. If desired, network 8 may include numerous other network devices (e.g., switches such as top-of-rack switches, core switches, multi-layer switches, etc., other routers such as hub routers or other intermediate routers, generally any hub network devices, and any branch network devices, etc., that are connected to one another using network paths through other network devices and/or service provider networks). If desired, network 8 may include numerous other hosts (e.g., computing equipment hosting (running or executing) server applications, computing equipment hosting client applications, computing equipment serving other functions, etc.) connected directly to routers 10-1 and 10-2, and/or other network devices.

These network devices in network 8 may form the underlying (physical) topology of network 8 implementing the WAN. One or more controllers such as controller(s) 16 may be configured to control the underlying network devices (based on routing tables stored at the underlying network devices and/or controller(s) 16) to implement a desired (software-defined) virtual topology that overlays the underlying topology of the WAN. When implemented in this manner, the network (e.g., network 8) may be referred to as a software-defined wide area network (SD-WAN).

In one illustrative arrangement, each path 12 (referring to each instance of paths 12) may implement a virtual tunnel link between router 10-1 and router 10-2 (e.g., through one or more service provider networks 14). Each virtual tunnel link may be a single-virtual-hop path or a multi-virtual-hop path (containing a combination of two or more serially-connected single-virtual-hop paths) between router 10-1 and router 10-2. While any given path 12 may extend across vast geographical locations (e.g., between network devices at different sites, between network devices at different regions, etc.) to connect routers 10-1 and 10-2 and thereby end hosts 20-1 and 20-2 behind them, the path 12 may implement a tunnel as part of the SD-WAN (therefore sometimes referred to herein as a SD-WAN tunnel). In other words, each path 12 implementing a virtual tunnel may have a first virtual tunnel end point at router 10-1 (at the router interface to host 20-1) and may have a second virtual tunnel end point at router 10-2 (at the router interface to host 20-2).

If desired, any of these tunnels may be implemented based on any suitable encapsulation or tunneling method such as Generic Router Encapsulation (GRE), Virtual Extensible LAN (VXLAN), IP Security (IPsec), etc.

If desired, different data packets conveyed between routers 10-1 and 10-2 (e.g., end hosts 20-1 and 20-2) may be dynamically routed through different paths 12. In particular, each path 12 may have associated characteristics or performance metrics (e.g., latency, jitter, loss rate, bandwidth etc.) and associated costs. One or more controller(s) 16 may dynamically update the stored routing tables to perform the dynamic routing of data packets (e.g., based on the type of data packets being routed, based on network load, based on path performance metrics, etc.).

To convey these data packets and ensure the successful delivery of data and message over one or more networks, hosts such as host 20-1 and host 20-2 may communicate with one another using the Transmission Control Protocol (TCP), which enables application programs and computing devices (e.g., hosting the application programs) to exchange messages over the one or more networks in a standardized manner. In particular, TCP supplements the Internet Protocol (IP) in enabling routers (e.g., routers 10-1 and 10-2) to route, during a TCP connection (sometimes referred to as a TCP session), segments of application messages across network portions (e.g., network portions 8A and 8B) connected by one or more service provider networks (e.g., the Internet).

In order to convey data packets through a network path (e.g., a path 12) based on TCP and IP, a packet-sending router sends data (payload) with one or more headers (e.g., an IP header, a TCP header, etc.). In some illustrative configurations, paths 12 may implement one or more (SD-WAN) tunnels, and as such, tunneling headers (header fields used to implement the tunnel functionality) may be used to encapsulate the data payload (e.g., the TCP/IP packet already containing the TCP/IP headers). If desired, other security headers (e.g., an IPsec header) may be used to encapsulate the data payload (e.g., the TCP/IP packet).

Figure 2:
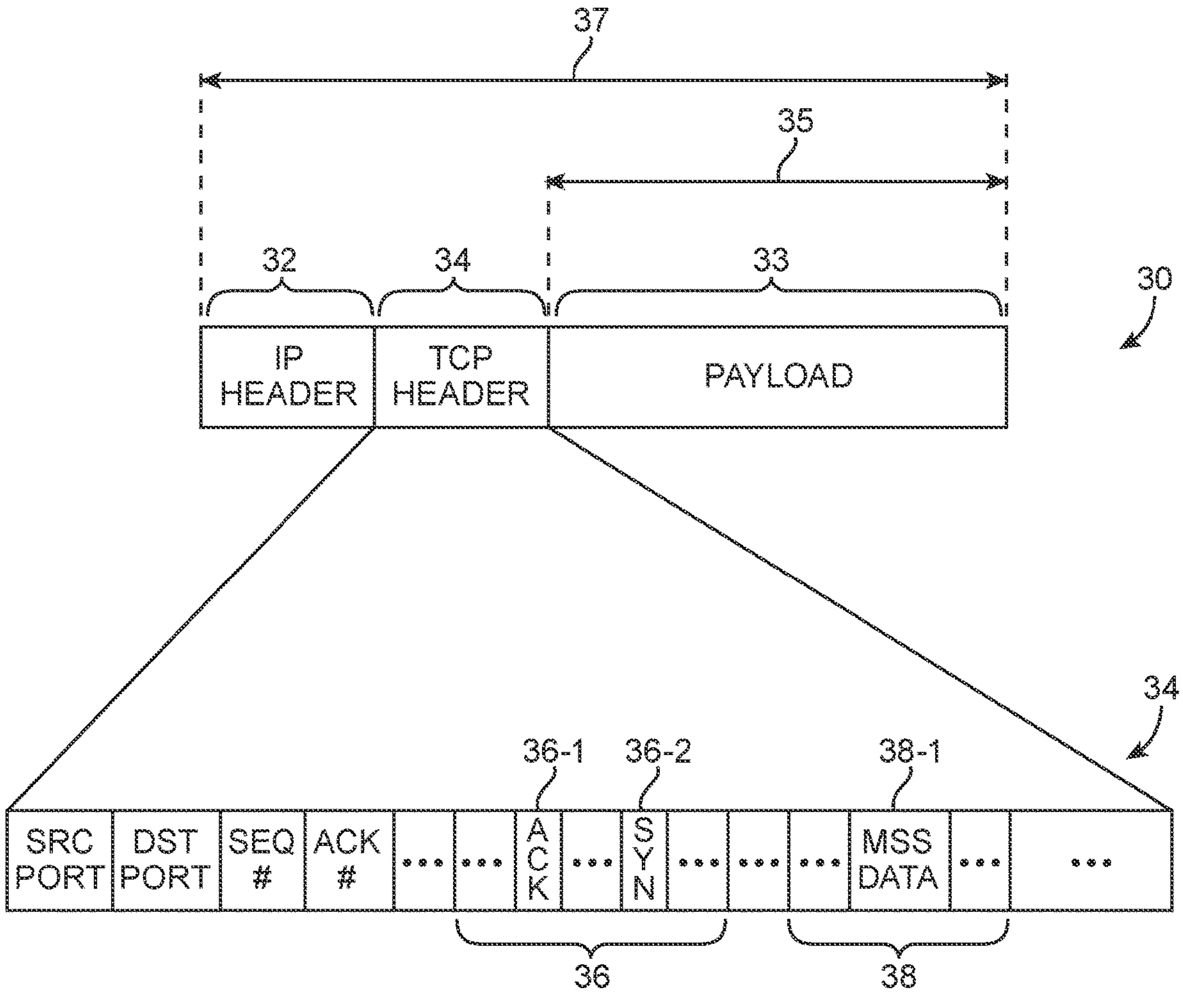
FIG. 2 is a diagram of an illustrative packet with IP (Internet Protocol) and TCP headers in accordance with some embodiments.

FIG. 2 is a diagram of an illustrative data packet having TCP and IP headers. As shown in FIG. 2, data packet 30 includes IP header 32 (e.g., an IPv4 header, an IPv6 header, etc.), TCP header 34, and (data) payload 33. In particular, the combination of TCP header 34 and (TCP) data payload 33 (e.g., application data) may sometimes be referred to herein as a TCP packet. The TCP packet may be conveyed by a sending host (e.g., client) to a receiving host (e.g., server). To facilitate routing of the TCP packet, a router (on the sending side) may encapsulate the TCP packet with additional IP headers 32 thereby forming an IP packet 30. While not explicitly illustrated in FIG. 2 in order to not obscure the present embodiments, the IP packet may further be encapsulated (if desired) with an IPsec header, a tunneling header, etc., and/or may be encapsulated to form an Ethernet frame.

IP header 42 may include various data fields (based on IP version) such as a version data field, a protocol data field, a header checksum data field, a source IP address data field, a destination IP address data field, options data fields, a traffic class data field, a flow label data field, a payload length data field, etc.

TCP header 34 may include various data fields such as a source port data field, a destination port data field, a sequence number data field, an acknowledgement number data field, a checksum data field, a flags data field 36, an options data field 38 that can contain zero or more options, etc. In particular, flags data field 36 may include ACK (flag) bit 36-1 and SYN (flag) bit 36-2. Options data field 38 may include a maximum segment size (MSS) data field 38-1 containing MSS data (e.g., an MSS value).

Figure 3:
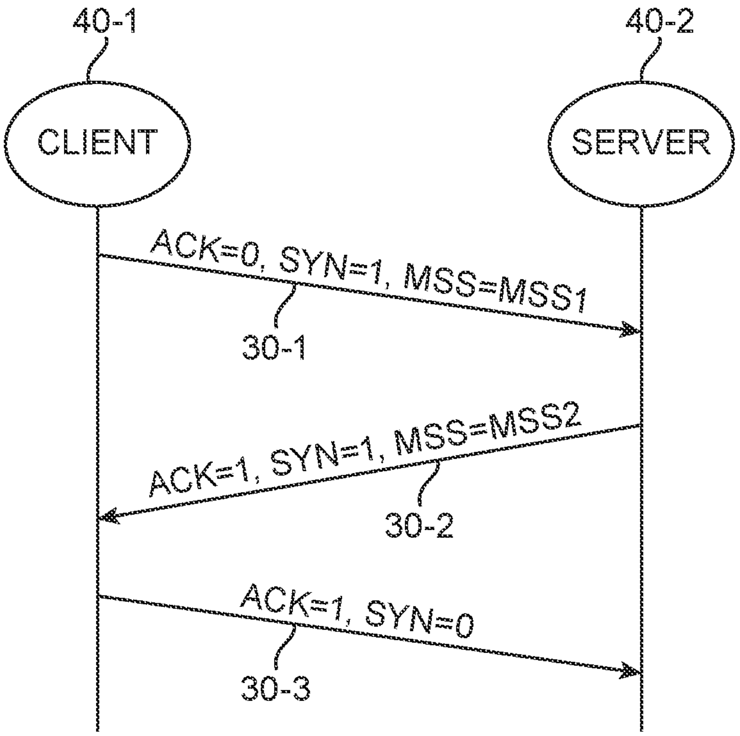
FIG. 3 is a diagram showing illustrative data packets for establishing a TCP connection between two hosts in accordance with some embodiments.

To open a connection using TCP, two hosts may perform a 3-way handshake (e.g., collectively convey a sequence of three messages between the two hosts) that involve the use of ACK bit 36-1, SYN bit 36-2, and MSS data field 38-1, among other data fields. FIG. 3 is a diagram showing how three illustrative network packets (e.g., packets 30-1, 30-2, and 30-3) are used to establish (e.g., open) a TCP connection.

In the example of FIG. 3, client device 40-1 (e.g., a first device such as host device 20-1 in FIG. 1 executing a client-side application) may establish a TCP connection with server device (e.g., a second device such as host device 20-2 in FIG. 1 executing a server-side application) via a sequence referred to as the TCP 3-way handshake. The handshake involves the exchange of three packets: a SYN packet, a SYN/ACK packet, and an ACK packet.

As shown in FIG. 3, device 40-1 may convey SYN packet 30-1 (e.g., a data packet 30 in FIG. 2 having TCP flag data field 36 with SYN bit 36-2 set to '1' and ACK bit 36-1 set to '0') to device 40-2 through one or more intervening routers (e.g., routers 10-1 and 10-2 in FIG. 1, hub routers, etc.). Responsive to receiving SYN packet 30-1, device 40-2 may convey SYN/ACK packet 30-2 (e.g., a data packet 30 in FIG. 2 having TCP flag data field 36 with SYN bit 36-2 set to '1' and ACK bit 36-1 set to '1') to device 40-1 through one or more intervening routers (e.g., routers 10-1 and 10-2 in FIG. 1, hub routers, etc.). Responsive to receiving SYN/ACK packet device 40-1 may convey ACK packet 30-3 (e.g., a data packet 30 in FIG. 2 having TCP flag data field 36 with SYN bit 36-2 set to '0' and ACK bit 36-1 set to '1') to device 40-2 through one or more intervening routers (e.g., routers 10-1 and 10-2 in FIG. 1, hub routers, etc.) to complete the handshake.

SYN packet 30-1 and SYN/ACK packet 30-2 may each include a MSS data field containing a (TCP) MSS value. The MSS value in the corresponding packet may represent the maximum size of a TCP segment (e.g., size of data payload 33) that can be received by the packet transmitting host device of the TCP connection. In particular, device 40-1 (e.g., host device 20-1 in FIG. 1) may use the MSS value (MSS1) in the sent SYN packet 30-1 to inform device 40-2 (e.g., host device 20-2 in FIG. 1) the maximum size of data payload that device 40-1 can receive in the data payload of packets during the TCP connection. In a similar manner, device 40-2 (e.g., host device 20-2 in FIG. 1) may use the MSS value (MSS2) in the sent SYN/ACK packet 30-2 to inform device 40-1 (e.g., host device 20-1 in FIG. 1) the maximum size of data payload that device 40-2 can receive in the data payload of packets during the TCP connection.

Relevantly, network paths in the underlying network (e.g., network 8) may each have a path Maximum Transmission Unit (MTU) value indicative of the total size of information (e.g., size of the entire packet, size of the entire frame, etc.) able to be conveyed using the network path. Using network 8 in FIG. 1 as an illustrative example, when conveying IP packets 30, each of paths 12 may have a corresponding MTU value. In particular, each MTU value may be derived from (the most restrictive of) an IP MTU value, an Ethernet MTU value, and/or other types of MTU values associated with the network path.

FIG. 2 further illustrates the relationship between the (TCP) MSS value and the MTU value. In particular, data payload 33 of packet 30 may have size 35 (e.g., length 35). Based on the conveyance of the MSS values during TCP connection establishment, each packet 30 conveyed during the TCP connection may have a size 35 that complies with (e.g., is no more than) the specified MSS value specified by TCP handshake. However, with the inclusion of headers such as IP header 32 and TCP header 34 (and/or if desired, other headers such as tunneling headers, security headers, etc.), each packet 30 (in its entirety) for the TCP connection may have a total size 37 (e.g., length 37). When size 37 of certain packets 30 exceed the MTU value associated with the paths on which these packets 30 are conveyed, these packets 30 may be undesirably fragmented.

While edge routers (e.g., the edge router on the ingress-side of path 12) coupled to the client and the server can perform TCP MSS clamping based on a manual (user) input of a known or default end-to-end path MTU clamp value between the edge routers such that a smaller TCP MSS clamp value (e.g., the end-to-end path MTU value excluding a header length) may overwrite the existing larger TCP MSS value in packets to prevent fragmentation, this approach has many limitations.

In particular, this approach requires manual configuration of the TCP MSS value and requires the knowledge of the path MTU value in a specific direction (opposite of the one that the packet with the TCP MSS clamp value is traversing). However, in asymmetric networks where the MTU value for a path when conveying a packet from the sender to the receiver differs from the MTU value for the same path when conveying packet from the receiver to the sender, the optimal TCP MSS values on both sides may not easily be known and therefore cannot be used (e.g., sub-optimal TCP MSS values are then used). Further, in dynamic networks where routing paths and therefore path MTU values change often, it may be burdensome to manually reconfigure the optimal TCP MSS value in response to each of these changes. Moreover, in large and scaling networks that include a large number of tunnel or path groups, the above-mentioned issues may further be exacerbated by the need to manually determine and configure large numbers of TCP MSS configurations and manually reconfigure the same large number of TCP MSS configurations as the path MTU values change dynamically.

To mitigate these issues or other similar issues (e.g., outside of the context of TCP MSS parameters as part of TCP connection establishment), a router may rewrite the packet size parameter values such as the TCP MSS values based on network dynamics. Configurations in which TCP MSS values are rewritten based on network dynamics are described herein as an example. In these configurations, a router (e.g., on an egress side of a tunnel path) that receives the packet (e.g., SYN packet 30-1 or SYN/ACK packet 30-2) may store path MTU information and update the path MTU information dynamically in response to network and path updates. The router may use the stored (up-to-date) MTU information to determine an optimal TCP MSS value associated with the TCP connection and replace the previous TCP MSS value in the packet with the optimal TCP MSS value.

Figure 4:
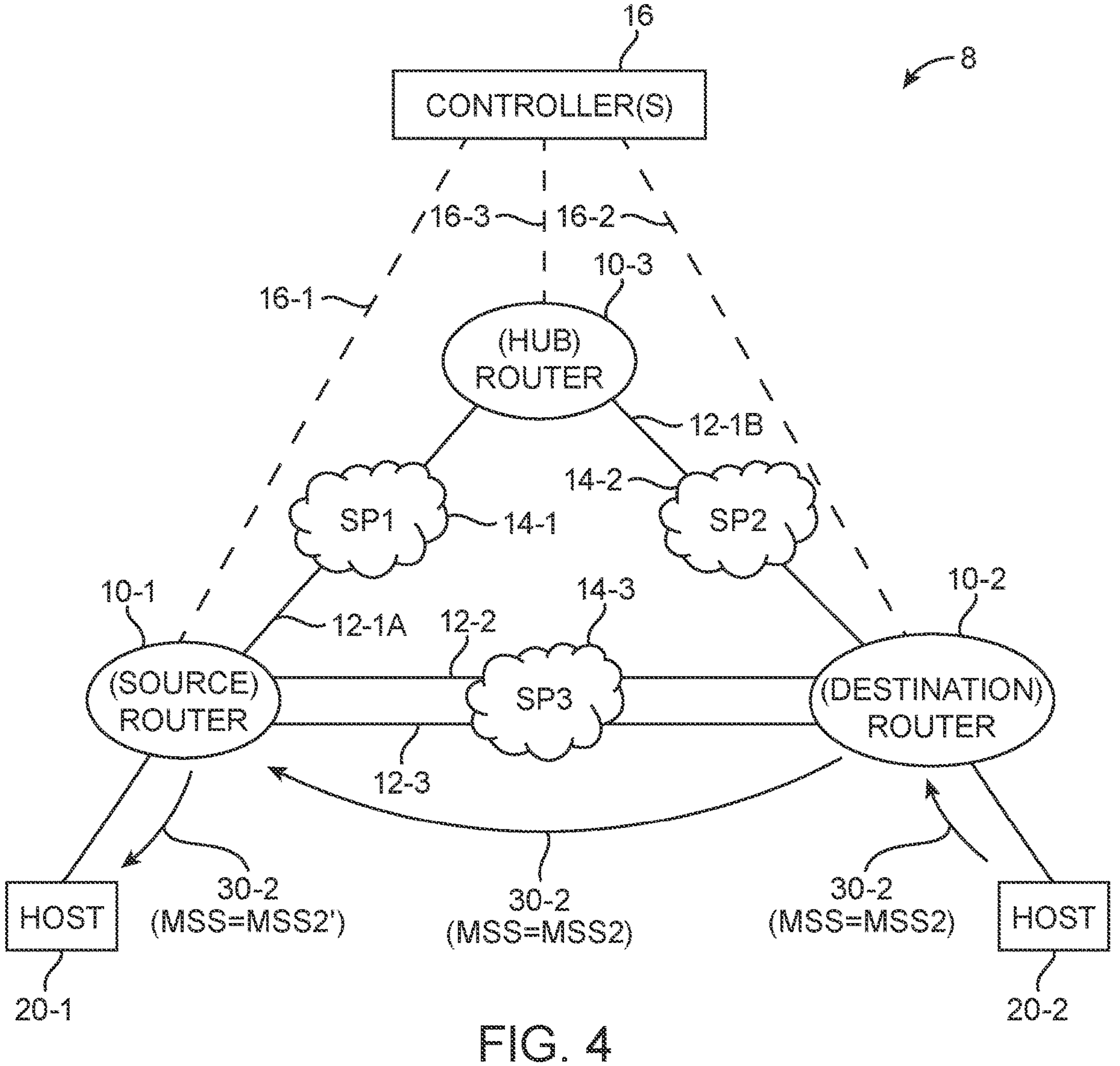
FIG. 4 is a functional block diagram of an illustrative network having a set of network paths connecting a first router to a second router in accordance with some embodiments.

FIG. 4 is a diagram showing an illustrative network configuration (e.g., an illustrative example of how network 8 in FIG. 1 may be configured) in which one or more routers may perform packet size parameter rewrite operations based on network dynamics. As shown in FIG. 4, host device 20-1 may be coupled behind edge router 10-1 (e.g., router 10-1 performs routing to and from host device 20-1). Host device 20-2 may be coupled behind edge router 10-2 (e.g., router 10-2 performs routing to and from host device 20-2). In some arrangements described herein as an example, router 10-1 may be described as a source router and router 10-2 may be described as a destination router to contextualize network flow in one illustrative direction (e.g., during a TCP connection).

Router 10-1 may be connected to router 10-2 via three different paths: path 12-1 (the combination of paths 12-1A and 12-1B), path 12-2, and path 12-3. Each of these paths may be tunnel paths (e.g., a virtual tunnel path that overlays underlying network devices). In some arrangements described herein as an illustrative example, network 8 may be a WAN overlaid with a virtual network topology having software-defined routing paths, thereby forming a SD-WAN. Furthermore, in these arrangements, each of paths 12-1, 12-2, and 12-3 may be a dynamic path selection (DPS) tunnel or path. Data packets between router 10-1 and router 10-2 may be conveyed selectively using one or more of the DPS tunnels. As an example, at each given time, a router (e.g., router 10-1 or 10-2) may direct data packets over a DPS tunnel with better or the best characteristics when compared to one or more of the other DPS tunnels as determined based on one or more path metrics such as load, packet loss, latency, jitter, etc.

As shown in FIG. 4, path 12-1 (the combination of paths 12-1A and 12-1B) is a multi-virtual-hop path containing a first single-virtual-hop path 12-1A connecting router 10-1, through service provider network 14-1, to hub router 10-3, and a second single-virtual-hop path 12-1B connecting hub router 10-3, through service provide network 14-2, to router 10-2. Path 12-2 is a single-virtual-hop path connecting router 10-1, through service provider network 14-3, to router 10-2. Path 12-3 is a single-virtual-hop path connecting router 10-1, through service provider network 14-3, to router 10-2.

In the example of FIG. 4, host device 20-1 may establish a TCP connection with host device 20-2 using the SYN, SYN/ACK, and ACK packets as described in connection with FIG. 3. The automatic rewriting of the MSS value based on network dynamics is described in connection with SYN/ACK packet 30-2 in the example of FIG. 4. While described in connection with a SYN/ACK packet, analogous devices and their corresponding operations may similarly be applied to the automatic rewriting of the MSS value for a SYN packet.

In particular, (after receiving a SYN packet at host 20-2) host 20-2 may transmit SYN/ACK packet 30-2 having an MSS value of MSS2 to router 10-2. Router 10-2 may then convey SYN/ACK packet 30-2 having an MSS value of MSS2 to router 10-1 through one of paths 12-1, 12-2, or 12-3. Upon receipt of SYN/ACK packet 30-2, router 10-1 may rewrite the MSS value of MSS2 with an updated MSS value of MSS2' (and modify any other appropriate data fields such as a checksum data field). Router 10-1 may subsequently transmit SYN/ACK packet 30-2 with the updated MSS value of MSS2' to host 20-1.

Router 10-1 may determine the updated MSS value to be rewritten into packet 30-2 based on the path MTU values of each of the paths (tunnels) connecting router 10-1 to router 10-2. In particular, FIGS. 5A and 5B show illustrative mathematical formulas useable to determine an updated (optimal) MSS value. In particular, router 10-1 (and other routers such as router 10-2) may be configured to determine one or more updated MSS values based on these formulas.

As shown in FIG. 5A, using equation 46, a router or other network device may determine a minimum path MTU value ($MTU_{min}$) by first measuring or otherwise determining the path MTU value across each of the paths for the TCP connection (e.g., each of the DPS tunnels) and taking a minimum value of these path MTU values as the minimum path MTU value ($MTU_{min}$). Especially in the scenarios where any of the paths or tunnels connecting the two end points can be used to transport packets during the TCP connection (e.g., when the paths are DPS tunnels), the path MTU values across all of these paths may be relevant to determining the most restrictive of these paths (and consequently the most limiting packet size requirements).

In the example of router 10-1 and SYN/ACK packet 30-2 as described in connection with FIG. 4, router 10-1 may measure or otherwise determine the path MTU values of path 12-1, path 12-2, and path 12-3. Based on equation 46, router 10-1 may determine minimum path MTU ($MTU_{min}$) as the smallest or minimum of the path MTU value of path 12-1, the path MTU value of path 12-2, and the path MTU value of path 12-3.

As shown in FIG. 5B, using equation 48, a router or other network device may determine an updated (optimal) MSS value ($MSS_{updated}$) by subtracting a (total) header length from the minimum path MTU value ($MTU_{min}$) (e.g., as determined using equation 46 in FIG. 5A). In the example of router 10-1 and SYN/ACK packet 30-2 as described in connection with FIG. 4, router 10-1 may calculate the updated MSS value by subtracting the determined minimum path MTU across paths 12-1, 12-2, and 12-3 by an IP and TCP header length (e.g., 40 bytes). The calculated MSS value (shown in FIG. 4 as value MSS2') may replace MSS value originally in SYN/ACK packet 30-2 when sent by host 20-2. If desired, the subtracted header length may include lengths of headers other than the IP and TCP headers (e.g., lengths of additional tunneling, security, and/or other types of headers).

Still referring to FIG. 4, for single-virtual-hop paths such as paths 12-2 and 12-3 with an end point at router 10-1, router 10-1 may directly (internally) determine the path MTU values of paths 12-2 and/or path 12-3, e.g., using Path MTU Discovery based on the Don't Fragment (DF) flag bit or using any other suitable path MTU determination technique. However, in the case of multi-virtual-hop paths such as path 12-1 which contains path portion 12-1B without an end point at router 10-1, router 10-1 may only be able to determine the path MTU value of a portion of the multi-virtual-hop path having an endpoint at router 10-1 (e.g., path portion 12-1A directly connecting router 10-1 to hub router 10-3). In other words, router 10-1 may be unable to determine the path MTU value of a more distant portion of the multi-virtual-hop path (e.g., path portion 12-1B not directly connected to router 10-1).

For these multi-virtual-hop paths (e.g., path 12-1), one or more controllers 16 (referred to herein in aggregate as controller 16) may instead determine the overall path MTU across the combination of path portions that make up these paths.

As shown in FIG. 4, controller 16 may be coupled to routers 10-1, 10-2, and 10-3 via respective control paths 16-1, 16-2, and 16-3 (which may be the same or different paths from the network data paths in the network). Controller 16 may receive network topology information such as path MTU information from each of routers 10-1, 10-2, and 10-3. In particular, each router may convey determined path MTU values for each single-virtual-hop path having an end point at that router to controller 16. Based on these path MTU values for single-virtual-hop paths (e.g., path portions of a multi-virtual-hop path) received by controller 16 from each router, controller 16 may calculate the overall path MTU values for multi-virtual-hop paths. Controller 16 may advertise or send the network topology information such as the overall path MTU values of relevant multi-virtual-hop paths (e.g., as requested, periodically, etc.) to each of routers 10-1, and 10-3.

If desired, instead of or in addition to the above-mentioned scheme for determining path MTU values for multi-virtual-hop paths internally within controller 16, the determination of path MTU values for multi-virtual-hop paths may occur at each router. As an example, controller 16 may receive path MTU value for path (portion) 12-1B from hub router 10-3 and may send the path MTU value for path 12-1B to router 10-1. Based on the internally determined path MTU value for path (portion) 12-1A and based on the received path MTU value for path 12-1B, router may determine the overall path MTU across the combination of path (portions) 12-1A and 12-1B (e.g., across path 12-1 connecting router 10-1 to router 10-2).

In general, whether calculated at controller 16 or at one of the routers, the overall path MTU value may be the smaller of the two MTU values (or in configurations where more than two portions exist to connect routers 10-1 and 10-2, the smallest of all MTU values across all portions). The overall path MTU value for path 12-1 may be used, along with the path MTU values for paths 12-2 and 12-3 to determine the updated optimal MSS value, e.g., using formulas 46 (FIG. 5A) and 48 (FIG. 5B).

Especially in configurations in which paths 12-1, 12-2, and 12-3 implement dynamic path selection tunnels, it may be desirable to determine the MSS value based on the smallest of the path MTU values across all of the dynamic path selection tunnels because network traffic may be routed through any of the dynamic path selection tunnels. If desired, the determination of MSS values as described in connection with FIGS. 4, 5A, and 5B may similarly be applicable to other types of tunnels or paths. The formulas in FIGS. 5A and 5B are merely illustrative. If desired, other formulas may be used to achieve the same or analogous results as described in connection with FIGS. 5A and 5B.

To illustrate the determination of a minimum MTU value, FIG. 6A shows an illustrative set of identified and/or determined MTU values in connection with network 8 in FIG. 4, as an example. As shown in FIG. 6A, table 50 includes illustrative path MTU values each associated with a path, a path portion, or (a minimum MTU value) across a group of paths. In this example, path (portion) 12-1A in FIG. 4 may have a path MTU value of 1500 bytes. If desired, router 10-1 may determine that path 12-1A has a path MTU value of 1500 bytes by performing a path MTU determination operation (e.g., a Path MTU Discovery technique or other customized path MTU determination technique). Path (portion) 12-1B in FIG. 4 may have a path MTU value of 1450 bytes. If desired, router 10-3 may determine that path 12-1B has a path MTU value of 1450 bytes by performing a path MTU determination operation. Router 10-1 may send the path MTU information for path 12-1A to controller 16, and router 10-3 may send the path MTU information for path 12-1B (e.g., the path MTU value of 1450 bytes) to controller 16.

Based on the received path MTU value of path 12-1A and the received path MTh value of path 12-B, controller 16 may determine (e.g., calculate) that the overall path 12-1 (across the combination of path portions 12-1A and 12-1B) may be the lesser of the two path MTU values, which is 1450 bytes. Controller 16 may then send the calculated path MTU value of 1450 bytes to router 10-1.

Path 12-2 in FIG. 4 may have a path MTU value of 1300 bytes. If desired, router 10-1 may determine that path 12-2 has a path MTU value of 1300 bytes by performing a path MTU determination operation. Path 12-3 in FIG. 4 may have a path MTU value of 1400 bytes. If desired, router 10-1 may determine that path 12-3 has a path MTU value of 1400 bytes by performing a path MTU determination operation.

Based on the determined path MTU values of paths 12-1, 12-2, and 12-3, router 10-1 may determine that the most restrictive or minimum MTU value ($MTU_{min}$) across paths 12-1, 12-2, and 12-3 is 1300 bytes (e.g., the path MTU value of path 12-2).

To illustrate the determination of an updated optimal MSS value (corresponding to the minimum path MTU value), FIG. 6B shows illustrative MSS values associated with SYN/ACK packet 30-2 in FIG. 4 such as an overwritten MSS value MSS2 and an overwriting (updated) MSS value MSS2'.

As shown in table 52 in FIG. 6B, SYN/ACK packet 30-2 may include MSS value MSS2 may have a value of 1410 bytes when being received at the router at the egress-side of paths 12 (e.g., router 10-1 in the example of FIG. 4). Using the illustrative path MTU values in the network configuration described in connection with FIG. 6A, the egress-side router may calculate an updated MSS value $MSS_{updated}$ of 1260 bytes (MSS2' in the example of FIG. 4) and may replace or rewrite the MSS value stored in SYN/ACK packet 30-2 with the updated MSS value $MSS_{updated}$ of 1260 bytes. In such a manner, the egress-side router may output SYN/ACK packet 30-2 with the new MSS value of 1260 bytes.

As described in connection with FIG. 5B, the egress-side router may determine the value of 1260 bytes based on the determined minimum MTU value of 1300 bytes. More specifically, in the example where only the TCP and IP headers are present in packet 30-2, the length of the TCP and IP headers (e.g., 40 bytes) may be subtracted from the minimum MTU value MTU min (e.g., 1300 bytes) resulting in the updated MSS value $MSS_{updated}$ (e.g., 1260 bytes).

While some of the processing and/or determination operations described in connection with FIGS. 5A, 5B, 6A, and 6B may be actively performed (in real-time) while SYN/ACK packets are being received at the egress-side router, the described MTU information (e.g., minimum MTU values) and/or MSS information (e.g., the MSS values for overwriting corresponding values in received packets) may additionally or instead be stored at the router in a table, dictionary, and/or other data structure. In particular, the relevant path MTU and/or MSS information may be stored at each egress-side router, thereby enabling the corresponding packet processing (e.g., MSS value rewrite) to occur at the egress-side router (e.g., router 10-1 for packet 30-2 in the example of FIG. 4, router 10-2 for packet 30-1, etc.).

FIG. 7 shows illustrative path MTU information that may be stored at an illustrative router such as router 10-1 or router 10-2 in FIG. 4. In the example of FIG. 7, the router may store a set of minimum MTU values ($MTU_{min}$). In particular, the router may store a given minimum MTU value for each destination virtual tunnel end point (VTEP) IP address (e.g., associated with one or more tunnels such as SD-WAN tunnels) from the perspective of the router (serving as the source router). The VTEP IP address may be the network flow next-hop IP address from the perspective of the router. In other words, the list of flow destination VTEP IP may represent a list of possible next-hop IP addresses for network flow leaving the router, and a minimum MTU value is stored along with each of these next-hop IP addresses.

As shown in FIG. 7, a first flow destination VTEP IP address VTEP IP 1 may have a stored (previously determined) $MTU_{min}$ value of 1300 bytes, a second flow destination VTEP IP address VTEP IP 2 may have a stored (previously determined) $MTU_{min}$ value of 1410 bytes, etc. In other words, the first flow destination IP address VTEP IP 1 may be for paths 12 connecting to host 20-2 (FIG. 4), whereas other flow destination IP addresses (e.g., VTEP IP 2) may be for other paths connecting to other host devices. In general, each minimum MTU value for a given flow destination VTEP IP address may be the minimum of path MTU values across all paths connecting the router (associated with the source VTEP IP address) to the destination VTEP IP address (associated with another router and host).

The router may calculate and store MTU information (e.g., the $MTU_{min}$ value) for one or more (e.g., all) flow destination VTEP IP addresses in the network. Upon receiving a packet, the router may perform a source IP lookup operation in the overlay routing table to identify the destination VTEP IP address associated with the packet (e.g., and the corresponding network flow thereafter). This identified destination VTEP IP address may be used to lookup the corresponding stored minimum MTU value in table 54.

Accordingly, the router may calculate the updated MSS value based on the determined corresponding $MTU_{min}$ value to rewrite into the packet. The router may maintain the MTU information during the operation of the router. In particular, the router may initially populate the MTU information for any flow destination IP addresses for which the minimum MTU value has not yet been determined, may update the already populated minimum MTU information for any flow destination IP address for which there are changes in the network paths that might affect path MTU, and/or may generally maintain an up-to-date set of minimum MTU values. If desired, the maintenance of these minimum MTU values may be based on calculating minimum MTU values using formula 46 in FIG. 5A.

While the illustrative MTU information is shown in FIG. 7 to be organized as a table (e.g., table 54), this is merely illustrative. If desired, router 10-1 may store the MTU information relative to flow destination VTEP IP address in any suitable manner (e.g., using any suitable data structure). If desired, information other than the minimum MTU values (e.g., individual path MTU values for each path in the group of paths connecting to a particular flow destination IP address as illustrated in FIG. 6A, calculated MSS values based on the minimum MTU information, or other information indicative of the minimum MTU values) may be stored for each flow destination IP address instead of or in addition to the minimum MTU values.

In the examples described in connection with FIGS. 4-7, the rewriting of the TCP MSS value on SYN/ACK packet 30-2 by router 10-1 are detailed. If desired, router 10-2 may perform similar processing with respect to rewriting the TCP MSS value on SYN packet 30-1. In particular, router 10-2 may similarly determine and/or receive path MTU values for paths 12 from router 10-2 to router 10-1, may determine and/or store a minimum path MTU value for paths 12 and additional minimum path MTU values for other VTEP IP addresses, may calculate an updated optimal TCP MSS value based on the minimum MTU value for paths 12 to rewrite into SYN packet 30-1.

Figure 8:
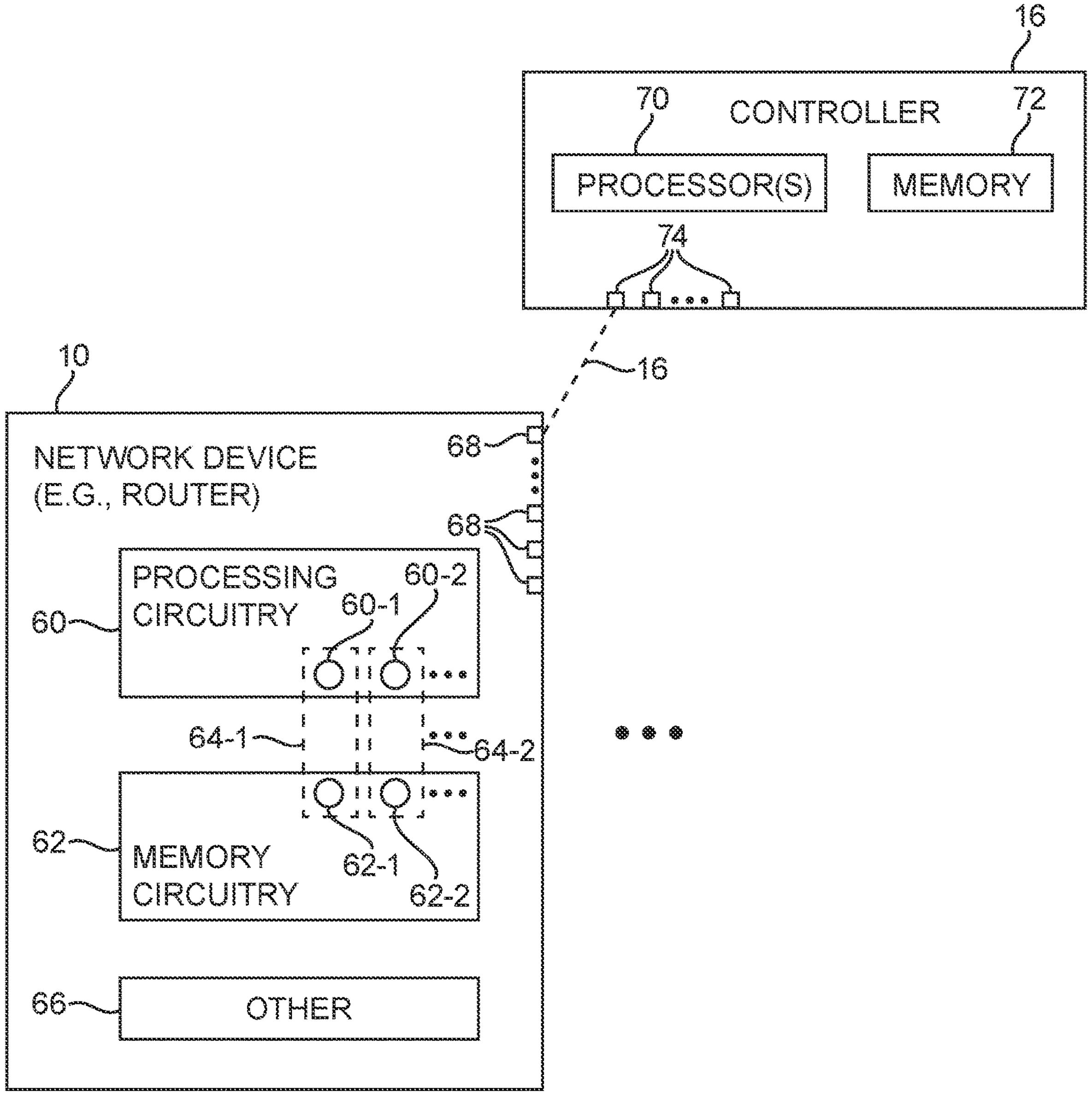
FIG. 8 is a functional block diagram of an illustrative network system having one or more network devices and one or more controllers in accordance with some embodiments.

FIG. 8 is a diagram of illustrative configurations for one or more network devices 10 such as router 10-1 and router 10-2 (e.g., in FIGS. 1 and 4) and one or more controllers 16 (e.g., in FIGS. 1 and 4). As shown in FIG. 8, network device 10 (e.g., a router or other device with routing functionalities) may include processing circuitry 60, memory circuitry 62, and other components 66 such as input-output ports 68.

In particular, processing circuitry 60 may include one or more processors or processing units based on microprocessors on general-purpose processors, microcontrollers, digital signal processors, programmable logic devices such as a field programmable gate array device (FPGA), application specific system processors (ASSPs), application specific integrated circuit (ASIC) processors, etc. Memory circuitry 62 may include volatile memory such as dynamic random-access memory, static random-access memory, etc., and non-volatile memory such as hard-drive storage, solid-state storage, flash memory, etc.

In general, the operations described herein relating to the operation of routers (e.g., routers 10-1 and 10-2) and/or other relevant operations may be stored as (software) instructions on one or more non-transitory computer-readable storage media (e.g., memory circuitry 62) in each network device. The corresponding processing circuitry (e.g., processing circuitry 60) in each network device for these one or more non-transitory computer-readable storage media may process the respective instructions to perform the corresponding router operations.

Portions of processing circuitry 60 and respective portions of memory circuitry 62, collectively, may formed different functional modules in network device 10 because the two portions are often collectively used to process operations to perform these functions (e.g., by sending and/or receiving requests, control signals, data, etc.).

As an illustrative example, network device 10 may include one or more management modules 64-1 implemented using a first portion of processing circuitry 60-1 (e.g., one or more processors) and a first portion of memory circuitry 62-1 (e.g., one or more memories). In this example, a management module 64-1 (e.g., formed from a general-purpose processor that processes instructions stored on a dynamic random-access memory) may form the control plane or control layer of network device 10 (e.g., for managing and controlling operation of other components of network device 10).

Additionally, network device 10 may include one or more packet processing modules 64-2 implemented using a second portion of processing circuitry 60-2 (e.g., one or more processors) and a second portion of memory circuitry 62-2 (e.g., one or more memories). In this example, a packet processing module 64-2 (e.g., formed from packet processing circuitry such as an ASIC processor, an FPGA device, and/or a digital signal processor that operates using a content-addressable memory (CAM)) may form the data or forwarding plane or the data layer of network device 10 (e.g., for handling ingress and egress network packets, e.g., based on the control scheme specified using management module 64-1).

As examples, a packet processing module 64-2 may include one or more ingress pipelines on which newly received (ingress) packets are processed to generate intermediate packets and may include one or more egress pipelines to which the intermediate packets are sent and eventually output from the packet processing module 64-2. In an illustrative configuration, each (ingress and egress) pipeline may include a corresponding parser configured to parse packets (e.g., ingress packets, intermediate packets resulting from an ingress pipeline or other internal processor, etc.) and retrieve packet data within them and may include a corresponding processing engine that processes (modifies) the pipeline-received packet to arrive at resulting egress packets.

Network device 10 may include other components 66 such as one or more input-output ports 68 such as Ethernet ports or network interface ports that provide connections to other network elements (e.g., other routers, modems, controllers) in the network, power ports through which power is supplied to network device 10, or other ports. As examples, each port 68 may be coupled to a corresponding ingress pipeline to process packets received on that port and a corresponding egress pipeline to which packets are output on that port. An internal routing fabric (e.g., within network device 10) may connect corresponding packet processing modules to one another and may connect one or more ingress pipelines (and their corresponding ports) to egress pipelines (and their corresponding ports).

As further shown in FIG. 8, a network controller such as a controller 16 for controlling the operation of one or more network devices 10 may include processing circuitry 70, memory circuitry 72, and input-output ports 74.

In a similar manner as described above in connection with processing circuitry 60, memory circuitry 62, and input-output ports 68 in network device 10, the corresponding components in controller 16 may be implemented in a similar manner. In particular, processing circuitry 70 may include one or more processors or processing units based on microprocessors on general-purpose processors, microcontrollers, digital signal processors, programmable logic devices such as a field programmable gate array device (FPGA), application specific system processors (ASSPs), application specific integrated circuit (ASIC) processors, etc. Memory circuitry 72 may include volatile memory such as dynamic random-access memory, static random-access memory, etc., and non-volatile memory such as hard-drive storage, solid-state storage, flash memory, etc.

The operations described herein relating to the operation of controller 16 and/or other relevant operations may be stored as (software) instructions on one or more non-transitory computer-readable storage media (e.g., memory circuitry 72) in controller 16. The processing circuitry (e.g., processing circuitry 70) in controller 16 for these one or more non-transitory computer-readable storage media may process the respective instructions to perform the corresponding controller operations (e.g., path information determination operations such as path MTU determination and advertisement operations, network virtualization operations, etc.). Processing circuitry 70 and memory circuitry 72, collectively, may sometimes be referred to herein as the control circuitry of controller 16 because the two are often collectively used to control one or more components of controller 16 to perform these operations (e.g., by sending and/or receiving requests, control signals, data, etc.).

Input-output ports 74 of controller 16 may include network interface ports that provide connections to other network elements (e.g., switches, routers, modems, controllers) in the network, power ports through which power is supplied to controller 16, or other ports. In the example of FIG. 8, port 74 of controller 16 is coupled to port 68 of network device 10, thereby forming an interconnecting path 16. Path 16 may enable controller 16 and network device 10 to convey control signals (or commands) or other configuration information between them, thereby serving as a communication and control path. Path 16 may be a direct path (e.g., controller 16 is connected to device 10 via no other intervening network devices) or an indirect path (e.g., controller 16 is connected to device 10 via one or more intervening network devices). Each network device 10 (e.g., router 10-1 and router 10-2 in FIG. 1 and FIG. 4) may be coupled to and therefore communicate with controller 16 using any of the above-mentioned means. If desired, each network device 10 in network 8 may be coupled to multiple instances of controllers 16.

Figure 9:
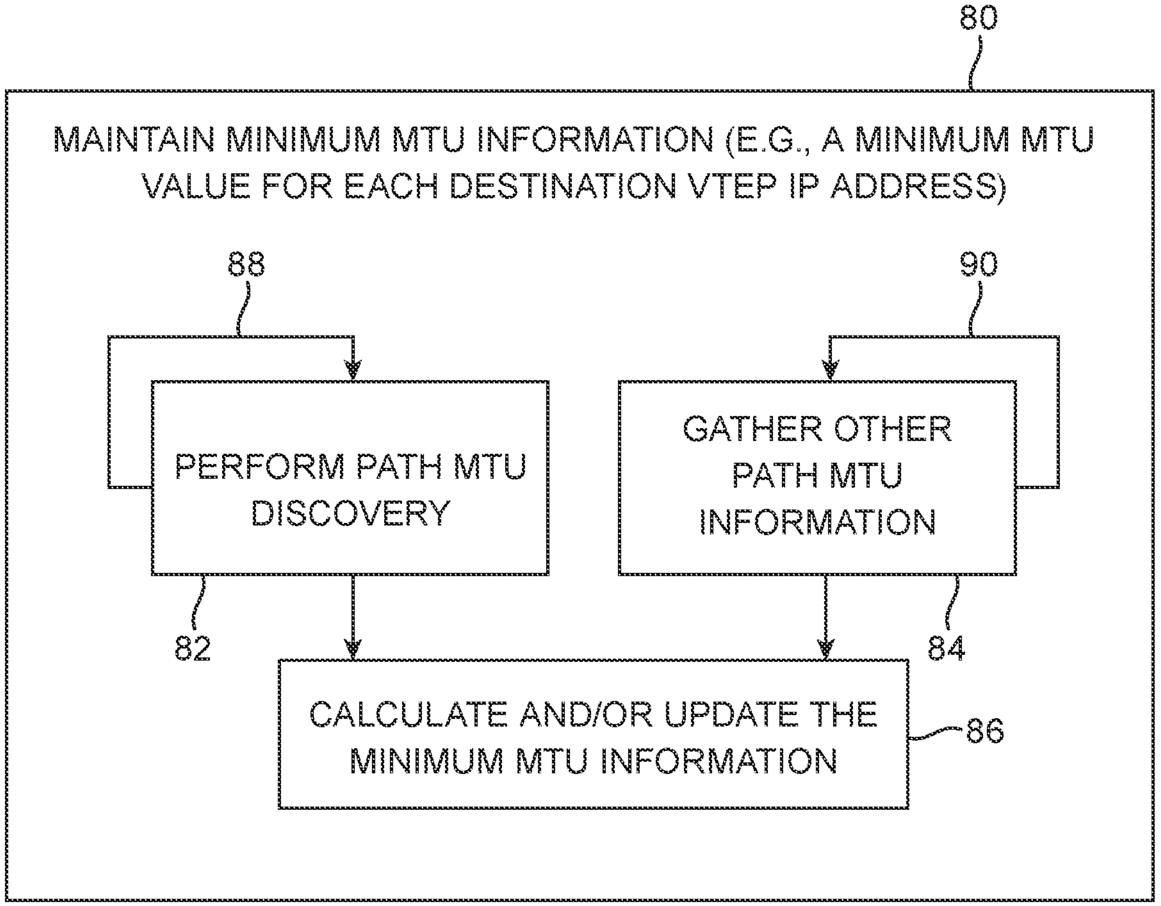
FIG. 9 is a flowchart of illustrative operations involved in maintaining MTU information in accordance with some embodiments.
Figure 10:
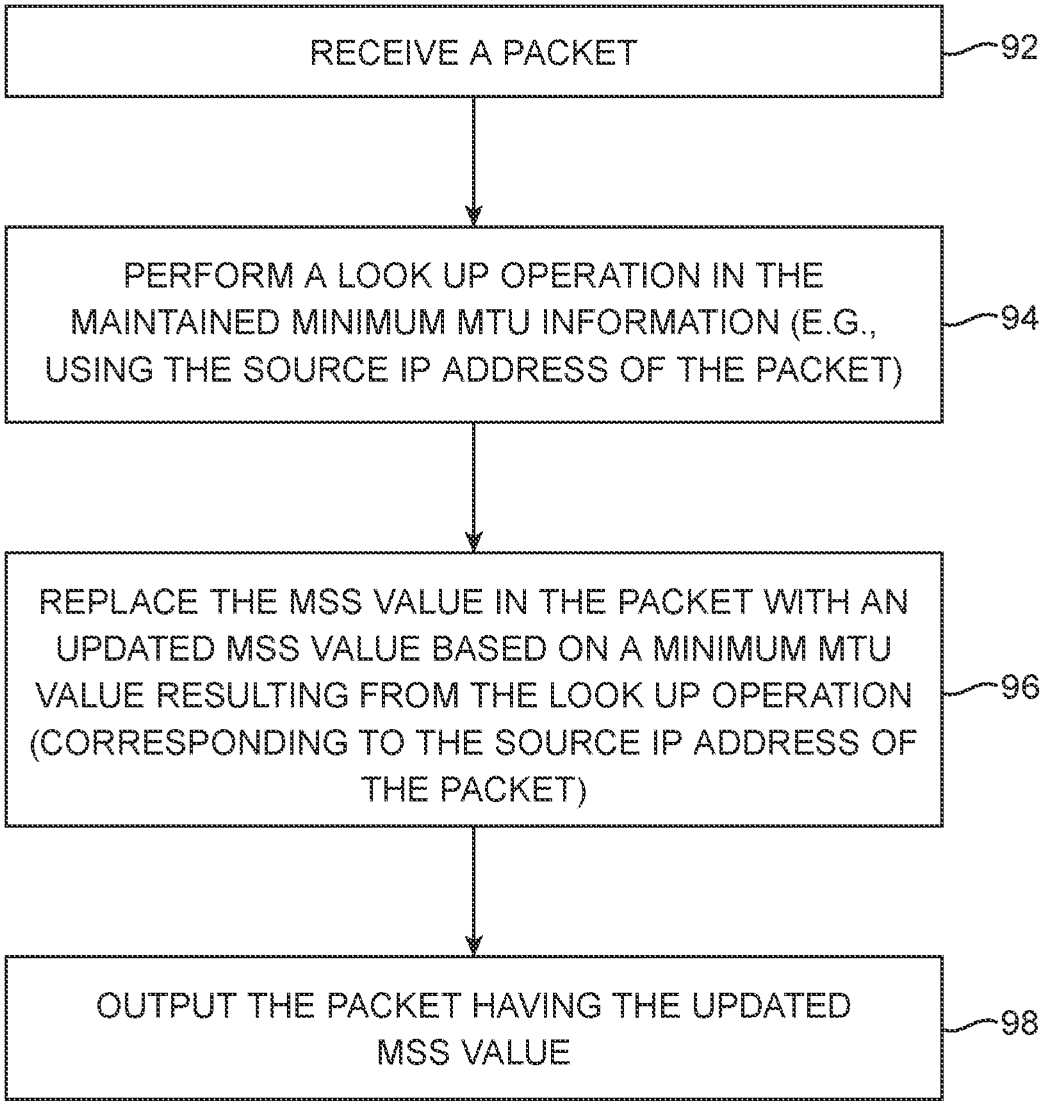
FIG. 10 is a flowchart of illustrative operations involved in rewriting a packet size parameter in a data packet in accordance with some embodiments.

FIGS. 9 and 10 are flowcharts of illustrative operations for performing packet size parameter rewrite operations based on network dynamics. The operations described in connection with FIGS. 9 and 10 may be performed at one or more components (e.g., processing circuitry 60 and memory circuitry 62) in one or more network devices 10 (e.g., at router 10-1, at router 10-2, at other routers, at controller 16, etc.) in network 8. While some operations are described as being performed at a router or a network device having routing functionalities, these operations may be performed at other network elements in network 8 such as one or more controllers 16 (e.g., at processing circuitry 70 and memory circuitry 72 of controller 16), if desired.

FIG. 9 is a flowchart of illustrative operations for maintaining path MTU information based on network dynamics (e.g., as the network changes). The maintained path MTU information may be used for packet size parameter (e.g., TCP MSS value) rewrite operations. At operation 80, the management module of network device 10 such as router 10-1 and/or router 10-2 (e.g., management module 64-1 in network device 10 implemented using processing circuitry when processing instructions on memory circuitry 62) may maintain MTU information such as a minimum MTU value ($MTU_{min}$) for each flow destination (VTEP) IP address (e.g., the information in table 54 in FIG. 7). In particular, portions of memory circuitry 62 in the router may be used to store the minimum MTU information (e.g., table 54 in FIG. 7).

In some illustrative arrangements described herein as an example, the management module of network device 10 may perform one or more of operations 82, 84, and 86 to maintain the minimum MTU information (e.g., minimum MTU values). As an example, the memory circuitry portion 62-2 forming a packet processing module 64-2 may store the minimum MTU information. The packet processing module 64-2 may use the stored minimum MTU information to modify packets received at network device 10. Management module 64-1 may update the stored minimum MTU information as network device 10 performs path MTU discovery operations, receives additional path MTU information from a controller, and/or otherwise receives updates indicative of network changes impacting path MTU values.

At operation 82, the management module of network device 10 may perform one or more path MTU discovery or determination operations to identify all paths (e.g., tunnels) directly connected to network device 10 and determine their corresponding path MTU values. In the example of FIG. 4, the management module of router 10-1 may identify paths 12-1A, 12-2, and 12-3 and determine their path MTU values based on one or more path MTU discovery operations.

At operation 84, the management module of network device 10 may gather other path MTU information, e.g., to identify all other relevant paths (e.g., tunnels) indirectly connected to network device 10 and determine their corresponding path MTU values. In the example of FIG. 4, the management module of router 10-1 may identify path 12-1B as a relevant but indirectly connected path (between router 10-1 and 10-2). The management module of router 10-1 may receive the relevant path MTU information (e.g., the path MTU value of path 12-1B) from controller 16.

In other words, using router 10-1 in FIG. 4 as an example, router 10-1 (at operations 82 and 84) may identify all of the different paths (e.g., their constituent path portions) from the source virtual tunnel end point at router 10-1 to the destination virtual tunnel end point at router 10-2 and obtain each of the path MTU values.

At operation 86, the management module of network device 10 may calculate the minimum MTU information based on the path MTU information determined internally at operation 82 and/or gathered externally at operation 84 (e.g., using equation 46 in FIG. 5A and/or the description in connection with FIG. 6A). If a different new MTU value is determined (for a given flow destination VTEP IP address), the management module may update the stored minimum MTU value with the newly calculated minimum MTU value.

As shown in FIG. 9, the management module may perform operation 82 at one or more times (e.g., repeated perform operation 82 as indicated by path 88). Similarly, the management module may perform operation 84 at one or more times (e.g., repeated perform operation 84 as indicated by path 20). After each instance of operation 82 and/or 84, the management module may also perform operation 86, if applicable, to recalculate minimum MTU values based on new information from the most recent instances of operations 82 and/or 84.

In general, one or more (e.g., all) of operations 82, 84, and 86 may occur or be performed continuously (e.g., with a desired periodicity). As an example, a router may perform a path MTU discovery process (algorithm) periodically, and in response to each instance of path MTU discovery, the router may recalculate the minimum MTU value to determine whether the currently stored minimum MTU value should be replaced with a new (more up-to-date) value. As another example, a controller may periodically gather path MTU information from routers under management and send the path MTU information to routers that lack this path MTU information, and in response to each instance of reception of path MTU information from the controller, the router may recalculate the minimum MTU value to determine whether the currently stored minimum MTU value should be replaced with a new (more up-to-date) value.

FIG. 10 is a flowchart of illustrative operations for processing one or more packets using a packet size parameter (e.g., TCP MSS value) rewrite operation. At operation 92, the packet processing module of network device 10 such as router 10-1 and/or router 10-2 (e.g., packet processing module 64-2 implemented using processing circuitry 60 when processing instructions on memory circuitry 62) may receive a packet that contains a packet size parameter from a virtual tunnel end point. In the example of FIG. 4, at operation 92, router 10-1 may receive, as output from one of paths 12 from the ingress-side virtual tunnel end point, SYN/ACK packet 30-2 that contains a TCP MSS value that may be replaced with an updated value. If desired, at operation 92, router 10-2 may receive, as output from one of paths 12 from the ingress-side virtual tunnel end point, SYN packet 30-1 (sent from host 20-1 to host 20-2) that contains a TCP MSS value that may be replaced with an updated value.

At operation 94, the packet processing module of network device 10 may perform a lookup operation in the maintained set of minimum MTU values to determine an applicable minimum MTU value to use for determining the optimal packet size value. As an example, a parser (e.g., in the ingress or egress pipeline) may retrieve the packet source IP address data from the packet. The processing engine (e.g., in the corresponding pipeline) may perform a route lookup operation (e.g., in a virtual overlay routing table) based on the source IP address of the packet to determine the destination VTEP IP address, and may compare the determined destination VTEP IP address to the destination VTEP IP addresses in the stored minimum MTU values table (e.g., table 54 in FIG. 7) to determine the corresponding minimum MTU value for the matching destination VTEP IP address.

At operation 96, the packet processing module of network device 10 may replace the MSS value in the packet with an updated MSS value based on the corresponding minimum MTU value resulting from the lookup operation performed during operation 94. As an example, the updated replacement MSS value may be the corresponding minimum MTU value subtracted by a header length (e.g., 40 bytes in scenario with IP and TCP headers).

At operation 98, the packet processing module of network device 10 may output the packet having the updated MSS value. In the case of SYN/ACK packet 30-2 sent from host 20-2 to host 20-1 (FIG. 4), host 20-1 may receive, from router 10-1, SYN/ACK packet 30-2 with the updated MSS value, which informs host 20-1 the appropriate packet size for transport during the TCP connection (even when the packets traverse through different parallel dynamic path selection tunnels 12). Analogously, in the case of SYN packet 30-1 sent from host 20-1 to host 20-2 (FIG. 4), host 20-2 may receive, from router 10-2, SYN packet 30-1 with the updated MSS value (e.g., the same or different from the updated MSS value in SYN/ACK packet 30-2), which informs host 20-2 the appropriate packet size for transport during the TCP connection (even when the packets traverse through different parallel dynamic path selection tunnels 12).

In general, operations 92, 94, 96, and 98 may be performed (by the packet processing module) for each packet as received by network device 10. While FIGS. 9 and 10 are described as being performed by different modules in a network device, if desired, one or more of the same processors and memories may be used to perform the operations of FIGS. 9 and 10. In other words, the delineation of tasks between different modules are merely illustrative.

In general, the operations described herein relating to the maintaining of MTU information (FIG. 9) and the processing of packets by writing a packet size parameter (FIG. 10), and any other associated (sub-)operations may be stored as software instructions on one or more non-transitory computer-readable storage media associated with one or more network devices 10 (e.g., memory circuitry 62 on router 10-1, memory circuitry 62 on router 10-2, etc.), one or more controllers 16 (e.g., memory circuitry 72 on a given controller 16), and/or other network devices in network 8. The corresponding processing circuitry (e.g., processing circuitry 60 in network device 10 such as in router 10-1, in router 10-2, etc., processing circuitry 70 in controller 16, etc.) associated with these one or more non-transitory computer-readable storage media may process the respective instructions to perform the corresponding operations.

The foregoing is merely illustrative of the principles of this disclosure and various modifications can be made by those skilled in the art without departing from the scope and spirit of the disclosure.

What is claimed is:

1. A method of operating a network device, the method comprising:

receiving, by the network device at which a first virtual tunnel end point (VTEP) is provided, a packet from a a second VTEP at a router, wherein the packet has a transmission control protocol (TCP) maximum segment size (MSS) data field containing a TCP MSS value and is a packet conveyed for establishing a TCP connection between a first host coupled to the network device and a second host coupled to the router;

determining, by the network device, a minimum Maximum Transmission Unit (MTU) value for virtual tunnels from the first VTEP, as a source VTEP, to the second VTEP, as a destination VTEP, wherein any of the virtual tunnels is usable to transport additional packets for the TCP connection between the first host and the second host, wherein the virtual tunnels from the first VTEP to the second VTEP each have a corresponding MTU value, and wherein the minimum MTU value is a minimum of the MTU values of the virtual tunnels from the first VTEP to the second VTEP;

replacing, by the network device, the TCP MSS value in the TCP MSS data field of the packet with a replacement value based on the minimum MTU value, wherein the minimum MTU value is a given MTU value of a given virtual tunnel of the virtual tunnels from the first VTEP to the second VTEP; and outputting, by the network device, the packet containing the replacement value in the TCP MSS data field.

2. The method defined in claim 1 further comprising:

maintaining a set of minimum MTU values, each corresponding to information indicative of a different destination VTEP, the set of minimum MTU values including the minimum MTU value corresponding to information indicative of the second VTEP.

3. The method defined in claim 2, wherein the information indicative of each of the different destination VTEPs is an Internet Protocol (IP) address.

4. The method defined in claim 3, wherein determining the minimum MTU value for the virtual tunnels from the first VTEP to the second VTEP comprises performing a lookup operation on the maintained set of minimum MTU values based on a source IP address of the packet.

5. The method defined in claim 2, wherein maintaining the set of minimum MTU values comprises determining a first MTU value corresponding to a first virtual tunnel in the virtual tunnels from the first VTEP to the second VTEP and a second MTU value corresponding to a second virtual tunnel in the virtual tunnels from the first VTEP to the second VTEP that is less than the first MTU value, wherein the minimum MTU value is determined to be the second MTU value, and wherein maintaining the set of minimum MTU values comprises storing the second MTU value as the minimum MTU value for the second VTEP.

6. The method defined in claim 5, wherein at least one of the first MTU value or the second MTU value is determined by performing a path MTU discovery operation.

7. The method defined in claim 5, wherein at least one of the first MTU value or the second MTU value is determined by receiving path MTU information from an external source.

8. The method defined in claim 1 further comprising:

subtracting a packet header length from the determined minimum MTU value to determine the replacement value.

9. One or more non-transitory computer-readable storage media comprising computer-executable instructions that, when executed by one or more processors for a network device, cause the one or more processors to:

determine a set of path Maximum Transmission Unit (MTU) values for a corresponding set of virtual tunnels from the network device to a router, wherein the set of path MTU values includes a first path MTU value for a first virtual tunnel, in the set of virtual tunnels, from the network device to the router and includes a second path MTU value for a second virtual tunnel, in the set of virtual tunnels, from the network device to the router;

determine a minimum of at least the first path MTU value for the first virtual tunnel from the network device to the router and the second path MTU value for the second virtual tunnel from the network device to the router as a minimum MTU value, wherein the minimum MTU value is determined for traffic transported from the network device to the router for a transmission control protocol (TCP) connection between a first host coupled to the network device and a second host coupled to the router and wherein the minimum MTU value is different than an additional minimum MTU value for traffic transported from the router to the network device for the TCP connection between the first host and the second host;

determine a packet size parameter value based on the minimum MTU value;

receive, from the router, a data packet;

replace a previously stored packet size parameter value in the data packet with the determined packet size parameter value; and transmit, to the first host, the data packet containing the determined packet size parameter value that replaced the previously stored packet size parameter value.

10. The one or more non-transitory computer-readable storage media defined in claim 9, wherein the set of virtual tunnels is a group of dynamic path selection tunnels, over which the traffic from the network device to the router for the TCP connection is conveyed selectively based on path characteristics.

11. The one or more non-transitory computer-readable storage media defined in claim 9, wherein the determined packet size parameter value is a TCP maximum segment size (MSS) parameter value, and the data packet is a SYN packet or a SYN/ACK packet.

12. The one or more non-transitory computer-readable storage media defined in claim 9, wherein the computer-executable instructions that cause the one or more processors to determine the packet size parameter value comprise computer-executable instructions that cause the one or more processors to subtract a packet header length from the minimum MTU value.

13. The one or more non-transitory computer-readable storage media defined in claim 12, wherein the packet header length comprises a packet tunneling header length or a packet security header length.

14. A method of operating a network device, the method comprising:

maintaining a set of minimum Maximum Transmission Unit (MTU) values for a set of destination virtual tunnel end point (VTEP) Internet Protocol (IP) addresses, wherein the set of minimum MTU values includes a first minimum MTU value that is a minimum of path MTU values for first paths connecting the network device to a first router associated with a first destination VTEP IP address in the set of destination VTEP IP addresses, and a second minimum MTU value that is a minimum of path MTU values for second paths connecting the network device to a second router associated with a second destination VTEP IP address in the set of destination VTEP IP addresses;

receiving, via the first router, a data packet, from a host device coupled to the first router, for establishing a Transmission Control Protocol (TCP) connection;

performing a packet source IP address lookup operation in an overlay routing table to identify the first destination VTEP IP address as a given destination VTEP IP address associated with the data packet;

determining, from the set of minimum MTU values, the first minimum MTU value as a value for modifying the data packet based on performing a lookup in the maintained set of minimum MTU values using the identified first destination VTEP IP address, wherein each path in the first paths is usable to transport network traffic for the TCP connection; and modifying a maximum segment size (MSS) value in the data packet to be an updated MSS value determined using the first minimum MTU value.

15. The method defined in claim 14, wherein the network traffic for the TCP connection is transported after receiving the data packet.

16. The method defined in claim 14 further comprising:

performing a path MTU determination operation to receive an updated path MTU value, wherein maintaining the set of minimum MTU values comprises updating the set of minimum MTU values based on the updated path MTU value.

17. The method defined in claim 14 further comprising:

receiving an updated path MTU value from an external device, wherein maintaining the set of minimum MTU values comprises updating the set of minimum MTU values based on the received updated path MTU value.

18. The method defined in claim 14, wherein modifying the MSS value in the data packet comprises replacing an existing MSS value in a data field of the received data packet with the updated MSS value, the method further comprising:

transmitting, to an additional host device, the data packet with the updated MSS value.

19. The method defined in claim 1, wherein the minimum MTU value is determined for traffic transported from the first VTEP to the second VTEP for the TCP connection and wherein the minimum MTU value is different than an additional minimum MTU value for traffic transported from the second VTEP to the first VTEP for the TCP connection.

20. The method defined in claim 1, wherein the virtual tunnels from the first VTEP to the second VTEP are dynamic path selection tunnels.

* * * * *